United States Patent
Stemmer et al.

[11] Patent Number: 6,156,089
[45] Date of Patent: Dec. 5, 2000

[54] TWO-STAGE AIR FILTER WITH MULTIPLE-LAYER STAGE AND POST-FILTER STAGE

[75] Inventors: Michael J. Stemmer, Collierville, Tenn.; Edward C. Sofsky, Batesville, Miss.

[73] Assignee: Air Kontrol, Inc., Batesville, Miss.

[21] Appl. No.: 09/129,356

[22] Filed: Aug. 5, 1998

Related U.S. Application Data

[63] Continuation-in-part of application No. 08/755,566, Nov. 27, 1996, Pat. No. 5,858,045.

[51] Int. Cl.$^7$ .................................................. B01D 19/00
[52] U.S. Cl. ............................ 55/467; 55/473; 55/486; 55/487; 55/492; 96/129; 96/135; 96/154
[58] Field of Search ........................... 55/473, 482, 485, 55/486, 487, 492, 497, 499, 467; 96/129, 135, 154

[56] References Cited

U.S. PATENT DOCUMENTS

| | | |
|---|---|---|
| Re. 35,236 | 5/1996 | Nolen, Jr. . |
| 3,388,536 | 6/1968 | Nash . |
| 3,494,113 | 2/1970 | Kinney . |
| 3,727,769 | 4/1973 | Scholl . |
| 4,126,560 | 11/1978 | Marcus et al. . |
| 4,217,386 | 8/1980 | Arons et al. . |
| 4,323,374 | 4/1982 | Shinagawa et al. . |
| 4,324,574 | 4/1982 | Fagan . |
| 4,340,402 | 7/1982 | Catron . |
| 4,376,642 | 3/1983 | Verity . |
| 4,631,077 | 12/1986 | Spicer et al. . |
| 4,737,174 | 4/1988 | Pontius . |
| 4,902,306 | 2/1990 | Burnett et al. . |
| 4,904,288 | 2/1990 | d'Augereau . |
| 5,049,172 | 9/1991 | Shary et al. . |
| 5,188,646 | 2/1993 | Nolen, Jr. . |
| 5,288,298 | 2/1994 | Aston . |
| 5,423,903 | 6/1995 | Schmitz et al. . |
| 5,501,794 | 3/1996 | Van de Graaf et al. . |
| 5,571,300 | 11/1996 | Stemmer . |
| 5,578,113 | 11/1996 | Glenn . |
| 5,690,719 | 11/1997 | Hodge . |
| 5,704,953 | 1/1998 | Stemmer .............................. 55/487 X |
| 5,772,738 | 6/1998 | Muraoka .............................. 55/486 X |

FOREIGN PATENT DOCUMENTS 2086194  8/1996  Canada .

*Primary Examiner*—Harold Joyce
*Attorney, Agent, or Firm*—Foley & Lardner

[57] ABSTRACT

A system for circulating air which includes particles, bacterial organisms, and odoriferous material includes a fan coupled to ducting of the air circulation system for causing movement of air in a stream through the ducting; a filter holder configured to hold an air filtering device supported within the air stream; and an air filtering device for removing from the circulating air the particles, bacterial organisms, and odoriferous material. The air filtering device may include multiple filter elements having multiple layers of differing filtering materials, which may include activated carbon and potassium permanganate. Also disclosed is an air filter for use in an air circulation system, comprising a housing, a first filter element configured to remove odoriferous materials and larger particles from the air, a second filter element configured to remove the remaining smaller particles from the air and to neutralize bacterial organisms, and a reticular support member interposed between and substantially in contact with the first filter element and the second filter element.

23 Claims, 4 Drawing Sheets

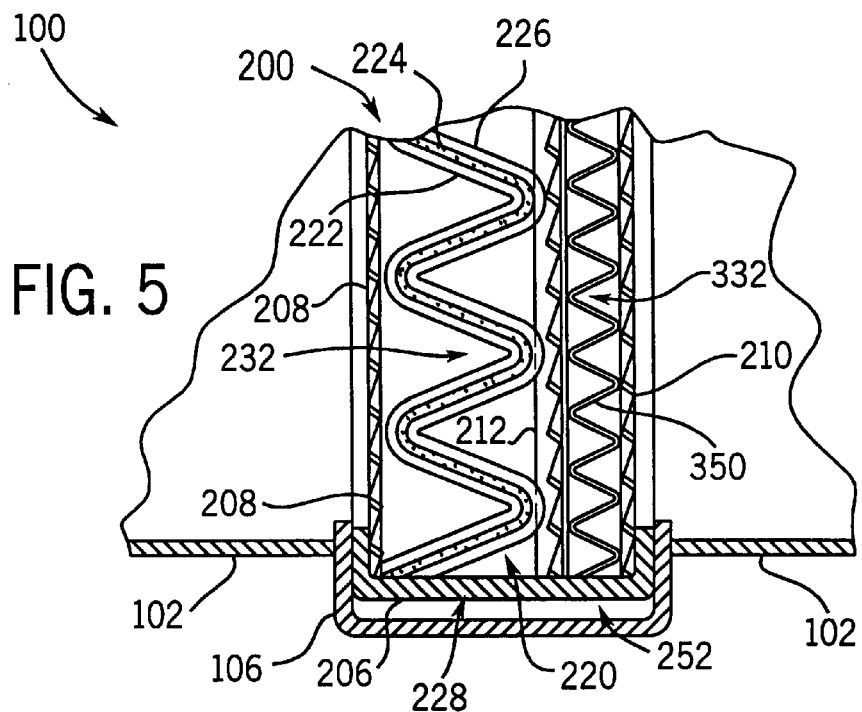
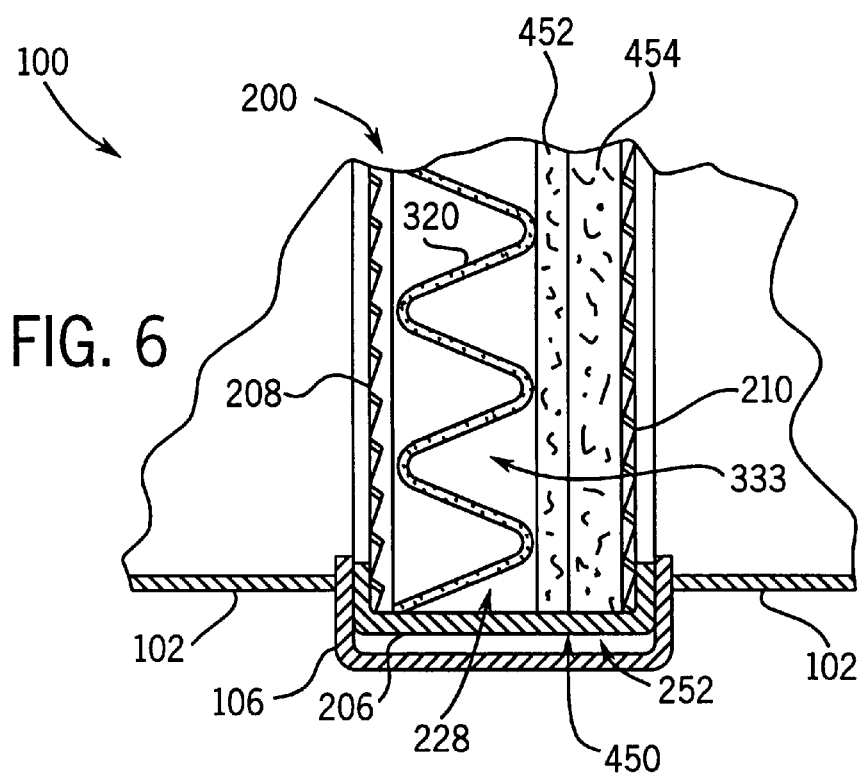

ized enclosing member constructed substantially of
sheet material, an inlet screen member, and an outlet screen
member. The filter also includes a first filter element con-
structed of a filtering material having a coarser mesh for
removing relatively large particles from the air. The first
filter element additionally includes an odoriferous material
sorbent. A second filter element constructed of a filtering
material having a finer mesh for removing smaller particles
from the air is also included in the filter. The second filter
element includes a biostat. A reticular support member is
disposed between, and in contact with, the first filter element
and the second filter element.

TWO-STAGE AIR FILTER WITH MULTIPLE-LAYER STAGE AND POST-FILTER STAGE

CROSS REFERENCE TO RELATED APPLICATIONS

The present application is a continuation-in-part of U.S. patent application Ser. No. 08/755,566, filed on Nov. 27, 1996 now U.S. Pat. No. 5,858,045.

FIELD OF THE INVENTION

The present invention relates to an air circulating system having a fan and a multi-stage air filtering device for forced air heating, ventilating and/or air conditioning ("HVAC") systems. More specifically, the present invention relates to an air filtering device which is provided with more than one filter element.

BACKGROUND OF THE INVENTION

Air circulating systems for use in residential and commercial heating, ventilating, and air conditioning (HVAC) systems typically include a fan (the term "fan" including propeller fans, centrifugal blowers, and comparable air movers), ducting and/or duct fittings to connect the fan to the HVAC system, a filter holder configured for removal and replacement of an air filter, and an air filter.

Air filters such as those used in HVAC systems are provided with one or more types of filtering media or materials. Depending upon the type of substance sought to be filtered or removed from the air (e.g. dust or other debris particles, tobacco smoke particles, pollens, bacterial organisms, odoriferous gasses, etc.), and/or the useful filter life required, different filtering materials may be selected. Examples of such filtering materials are wet or dry laid paper which may include glass fibers, wet or dry laid fiberglass, synthetic microfibers in woven layers or nonwoven batts with or without tackifiers, open or closed cell polymeric foams, metal meshes, activated carbon, and biostats such as potassium permanganate.

A problem which sometimes arise when selecting a specific filtering material for a particular filtering requirement is that filtering performance for other coexisting requirements may be compromised. Accordingly, it would be desirable to combine different types of filtering materials within a filtering device which will then meet more than one filtering requirement including not just particulate removal but removal of odors and neutralization of bacterial organisms as well.

For structural integrity and for compactness (e.g., to fit within existing filter housings already installed in existing HVAC systems), it would also be desirable to provide a filtering device configured with more than one filtering material, or layer of filtering material, joined to each other and to a common support grid.

To help prevent distortion of filter elements in the presence of high pressure drops across them (caused, e.g., by high air flow rates and/or at least partial clogging of a filter element by filtrate), it would additionally be desirable for filter elements to be supported by adjacent filter or support screen elements as well as for the filtering device, as an assembly of filtering and support elements, to have a high bending modulus as provided by, for example, gluing or otherwise securing elements to each other whereby mechanical loads are shared by all elements of the assembled filtering device.

SUMMARY OF THE INVENTION

In one embodiment of the invention, an air circulation system comprises a fan in communication with system ducting for causing movement of air in a stream through the ducting, a filter holder for an air filtering device supported within the air stream, and an air filtering device having at least two filter elements, one of the filter elements including at least two layers of filtering material which differ from each other. The first filter element removes relatively large particles from the air and the second filter element removes smaller particles from the air.

In another embodiment of the invention, the first filter element includes at least one layer of filtering material constructed of a foamed polymer and a sorbent material suitable for removing of odors from the air stream. The second filter element is constructed of at least one layer of fine-mesh filtering material to trap particles of filtering material or sorbent which leave the first filter element and enter the air stream.

In another embodiment of the invention, the second filter element includes a biostat for neutralization of bacteria contained within the air.

In another embodiment of the invention, an air filter for use in an air circulation system comprises a housing for the holding of filter elements. The housing is disposed within a stream of air to be filtered and includes a peripherally disposed enclosing member constructed substantially of sheet material, an inlet screen member, and an outlet screen member. The filter also includes a first filter element constructed of a filtering material having a coarser mesh for removing relatively large particles from the air. The first filter element additionally includes an odoriferous material sorbent. A second filter element constructed of a filtering material having a finer mesh for removing smaller particles from the air is also included in the filter. The second filter element includes a biostat. A reticular support member is disposed between, and in contact with, the first filter element and the second filter element.

BRIEF DESCRIPTION OF THE DRAWINGS

FIG. 5 is a partial sectional view of another embodiment of the air circulating system shown in FIG. 3;

FIG. 6 is a partial sectional view of another embodiment of the air circulating system shown in FIG. 3.

DETAILED DESCRIPTION OF THE PREFERRED EMBODIMENT

Figure 1:
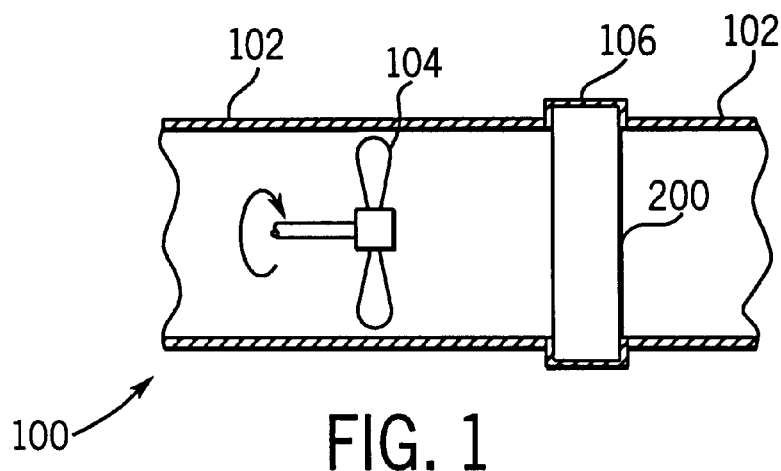
FIG. 1 is a schematic diagram of an air circulation system.

Referring to FIG. 1, an air circulation system 100 such as that of an HVAC (heating, ventilating, air conditioning) system in a building includes a fan 104, a duct or ducting 102, an air filter holder 106, and an air filtering device 200. Air filtering device 200 is supported within duct 102 by a filter holder 106. Duct 102 permits fluid communication between fan 104 and filter holder 106.

In operation, fan 104 forces air through air filtering device 200. Depending upon the type of material used to fabricate the one or more filter elements (shown in FIGS. 3 through 7) within air filtering device 200, air filtering device 200 will remove certain materials from the air forced therethrough by fan 104.

Figure 2:
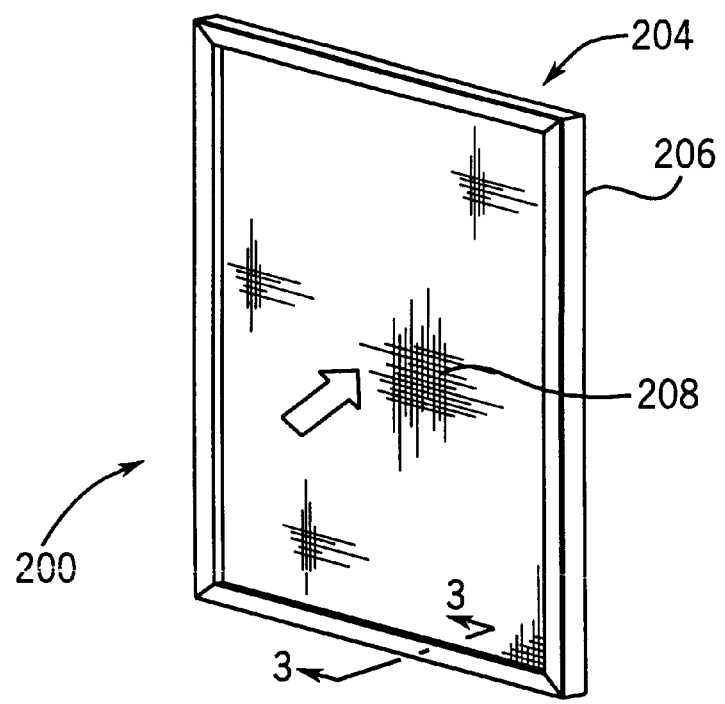
FIG. 2 is a perspective view of an air filtering device.

Referring to FIG. 2, an external housing 204 of an air filtering device 200 includes a peripheral enclosing member 206, an inlet screen member 208, and an outlet screen member 210 (not shown). Peripheral enclosing member 206 may be fabricated, typically in a rectangular shape using four peripheral frame members, to fit a typical forced air heating system filter holder, in any of the commonly known and used methods and materials such as metals, plastics, or card stock. The peripheral frame members may have cross sections configured as U-channels, and may be connected at their ends to form corners of the rectangle by any of the commonly used methods of joining or forming (e.g., coping and bending, welding, gluing, taping, rivetting) ends of the frame members.

Inlet screen member 208 and outlet screen member 210 are planar, primarily structural elements, and serve to retain filter elements within housing 204. They may be fabricated of flat metal or plastic material having apertures for the passage of air; e.g., expanded metal mesh, grid, screening, or the like. The sizes, shapes, and pitches of their openings need not be regular and their surfaces need not be particularly uniform or planar; e.g., expanded metal sheet having irregularly shaped openings and upset mesh members works well.

Figure 3:
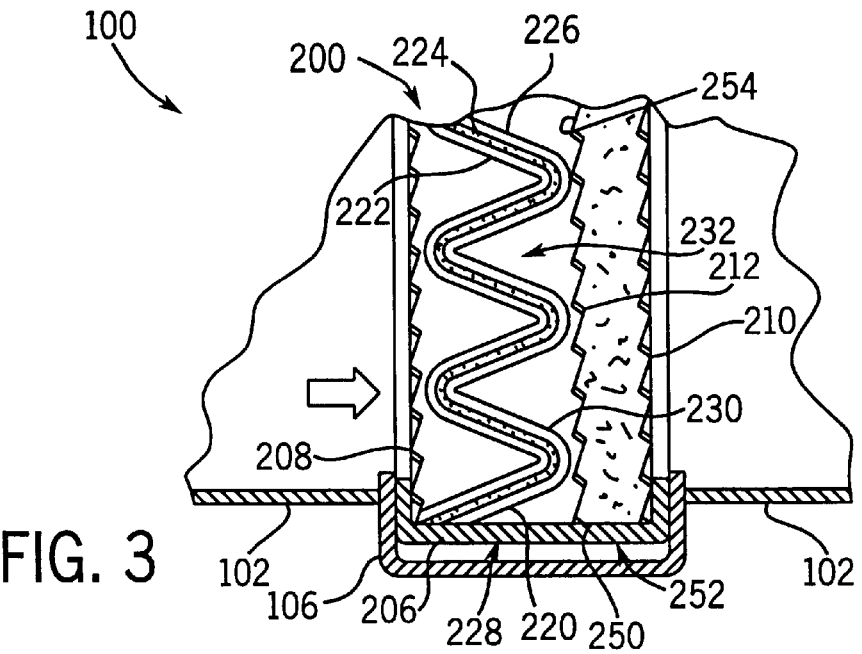
FIG. 3 is a partial sectional view of an embodiment of the air circulating system taken through the cutting line 3—3 of FIG. 2.

Referring now to FIG. 3, an embodiment of air filtering device 200 within air circulation system 100 is shown and includes multiple stages of filtering. Inlet screen 208, while primarily a structural element for retaining first filter element 220 within housing 204, may also on occasion function as a prefilter element in that it removes from the air large particles such as larger insects, clumps of pet hair, and like agglomerated debris. Outlet screen 210 is entirely a structural element for retaining second filter element with housing 204, and has no filtering function.

Adjacent to the inner surface (i.e., the outlet side) of inlet screen 208 are located a first filter element 220 having pleats 232 and a planar second filter element 250. An intermediate support member 212 may be disposed between first filter element 220 and second filter element 250 if desired (due, e.g., to exceptionally low stiffness of filtering materials selected for use within first filter element 220 and/or second filter element 250, such as a very soft polymeric foam or a loosely laid synthetic fiber batt). Use of support member 212 will not be required to support many commonly used filtering materials, however, which have enough mechanical stiffness to be self supporting when disposed between inlet screen 208 and outlet screen 210.

First filter element 220 includes a layer of a first filtering material 222, a reticular support structure 224, and a layer of a second filtering material 226. First filtering material 222 and second filtering material 226 may be like or differing materials, and are preferably secured to support structure 224 (e.g., by glue). Support structure 224 is preferably fabricated of a material (e.g., aluminum) having a stiffness which is high relative to the stiffnesses of first filtering material 222 and second filtering material 226 so that it may assist filtering material 222, 226 layers in keeping the shapes of their pleats 232.

Support structure 224, like inlet and outlet screens 208, 210 and, if used, support member 212, may be described as "reticular" (e.g., "net-like"), but with no requirement or connotation of rectangularity or regularity even though an expanded metal configuration is preferable. A high percentage of open area is required of these elements to allow air to pass with minimal pressure drop, and at least some of the mesh members which surround openings must be very generally distributed over the flow area of filtering device 200, but there is otherwise no requirement for uniformity or regularity of shape, size, or pitch of mesh members and of the openings they surround and define.

First filter element 220 is preferably manufactured by applying an appropriate adhesive to both sides of support structure 224, applying first filtering material 222 to one side of support structure 224 and second filtering material 226 to the other side of support structure 224, and allowing the adhesive to cure using heat, pressure, ultraviolet light, etc. as necessary for the materials and adhesive selected, either before or after forming pleats 232. Length and width of the formed laminate may then be trimmed to final dimensions appropriate to housing 204.

First and second filtering materials 222, 226 may be any of the filtering materials widely known and used in the art, but are preferably robust enough to withstand manufacturing in the configuration having pleats 232, of relatively high porosity so that second filter element 250 may serve as a postfilter, and appropriate for inclusion or addition of a sorbent 228 such as activated charcoal for odoriferous material removal. Some such materials are dry or wet laid paper with or without inclusion of glass fiber, open or closed cell foam of various polymers, and woven or non-woven glass or synthetic fiber media. Use of polypropylene fiber is preferred for its electret properties, whereby the flow of air through it generates an electrostatic charge which attracts and hold particles of unlike charge. First filtering material 222 may be of a coarser mesh than is second filtering material 226 to promote more uniform loading of first filter element 220 and thereby extend its useful life. Either, or, preferably, both, first and second filtering materials 222, 226 may contain a sorbent 228 such as activated charcoal for the removal of odoriferous materials.

The term "sorbent" as used herein refers to a material which retains, and thereby removes from the air, odoriferous gasses by absorption and/or adsorption.

Still referring to FIG. 3, second filter element 250 is of planar configuration and has a fine mesh to remove from the air smaller particles which have passed through the relatively coarse first filter element 220. Second filter element 250 may be fabricated from any of the materials described above for first filter element 220, but preferably includes a biostat 252 (e.g., potassium permanganate) for neutralization of bacterial organisms contained within the air.

The outer surfaces of holder 106 are permanently secured and sealed to duct 102 at both sides of holder 106 by means not shown but familiar to those knowledgeable in the art; e.g., welding, brazing, soldering, screwing or riveting with application of sealant. Housing 204 enclosing member 206 is removably sealed to the inner surfaces of holder 106 by means not shown but similarly known to those skilled in the art; e.g., compliant interference of holder 106 with housing 206 and/or gasketing.

Figure 4:
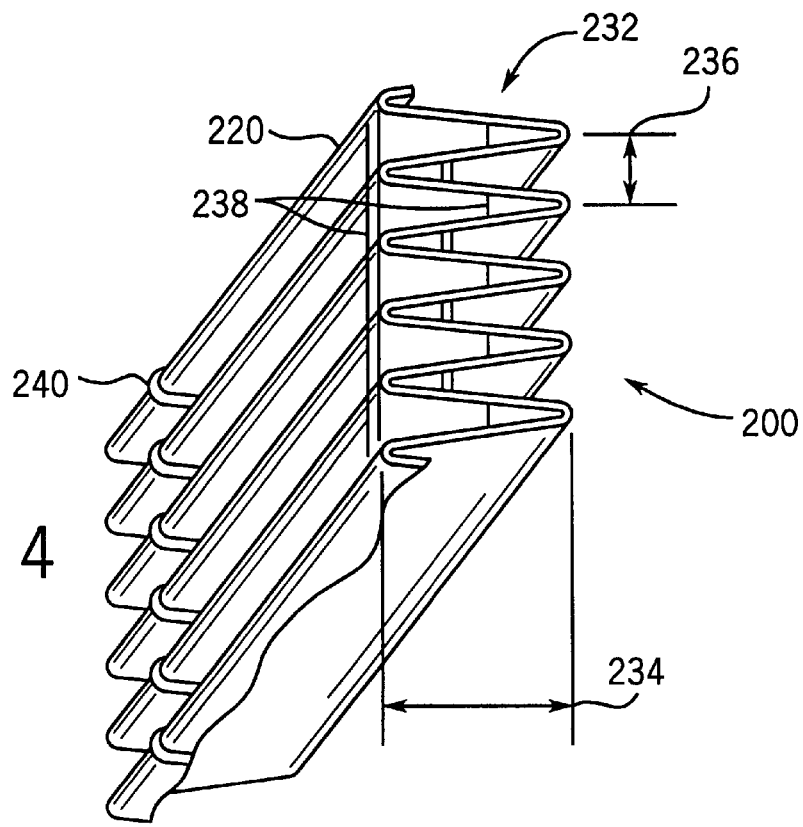
FIG. 4 is a partial perspective view of an air filtering device.

FIG. 4 shows details of pleated first filter element 220. Depth 234 and pitch 236 of pleats 232 may be selected as necessary to provide a total surface area of first filter element 220 as desired for a specific pressure drop and length of service life at a particular flow rate and anticipated contamination level of the air to be filtered.

Pleated first filter element 220 may be mechanically stiffened and strengthened against distortion, if found necessary or desirable, by addition of stiffening members of one or more configurations. Stiffening gussets 238 may be fabricated and secured individually to the pleats 232, or may be made as a notched strip which penetrates into the pleats 232 and is mounted to the housing 204. Alternatively, or additionally, one or more glue tracks 240 may be added, to either or both sides of first filter element 220, using hot-melt glue or other appropriate adhesive or appliable material before or after pleating. If added before pleating, they may be extended fully into the roots of pleats 232 on their concave sides, but the adhesive will have to be heated or otherwise softened to enable the pleating operation. If added after pleating, they will be difficult to extend fully into the roots of a more deeply pleated and finely pitched filter element, but, if the adhesive is viscous and the pleat 232 pitch 236 fine, they will bridge the gaps between pleats 232 and thereby additionally stiffen the structure of first filter element 220. The adhesive may lie upon the surface of the filtering material and form ridges as shown, or, if of a low viscosity, may soak into and beneath the surface of the filtering material and thereby form tracks of stiffened material.

Glue tracks 240 used as pleat 232 stiffening elements may also and simultaneously be used to secure first filter element 220 to inlet screen 208 and to second filter element 250 or, if used, support member 212, thereby strengthening not only first filter element 220 but air filtering device 200 as well.

Referring now to FIG. 5, an alternative embodiment of the invention is shown in which a second filter element 350 is provided pleats 332. Pleats 332 may be provided stiffeners (not shown) as described above for first filter element 220. Second filter element 350, being pleated, has a significantly larger surface area available for air flow than would a planar filter element of the same envelope dimensions, and hence can be made of a more finely meshed filtering material for a given low pressure drop at a given rate of air flow than can be a planar filter element. Second filter element 350 may be provided a biostat 252 as described above for second filter element 250.

For example a filtering device 200 having envelope dimensions of 23.5 inches high×23.5 inches wide×12 inches deep (in the direction of air flow) may be provided a multilayer pleated first filter element of 6 inch pleat depth and 1.5 inch pleat pitch and a single layer pleated second filtering element of 4.5 inch pleat depth and 0.225 inch pleat pitch. The projected surface area available for air flow is 23.5 inches×23.5 inches, or 552 square inches, but the actual flow area of the pleated first filter element would be approximately 23.5 ×2(23.5/1.5)×[(1.5/2)² +6²]$^{1/2}$, or 4452 square inches, eight times that of a planar filter element. Similarly, the actual flow area of the pleated second filter element would be 23.5×2(23.5/0.225)×[(0.225/2)²+4.5²]$^{1/2}$, or 22,097 square inches, 40 times that of a planar filter element. It becomes apparent that the large increases in flow area possible in design of a pleated filter element allow filtration of much higher efficiency; i.e., removal of more material and more finely divided material from the air at a given rate of air flow with no increase in pressure drop across the filter element.

Preferably, therefore, pleated second filter element 350 is made of a HEPA (High Efficiency Particulate Arresting or Air) or HEPA-like material, including a biostat 252 such as potassium permanganate, enabling it to remove particles as small as three microns from the air as well as to neutralize organisms such as bacteria. Since some granular sorbents 228 such as activated charcoal contained within first filter element 220 are frangible and tend to produce particles, some of them quite finely divided as a powder or dust, and since these fracture products enter the air stream, second filter element 350 therefore acts as a postfilter in removing sorbent particles from the air before they can enter building spaces being heated, ventilated, or cooled by air circulating system 100.

Pleats 332 of second filter element 350 are shown in parallel relationship to pleats 232 of first filter element 220, necessitating use of a support member 212 to prevent the finer-pitched pleats 332 from deflecting into the valleys between pleats 232. Pleats 332 need not be parallel to pleats 232, however, and rotating either first filter element 220 or second filter element 350 about an axis parallel to the direction of air flow will allow the peaks of pleats 232 and 332 to intersect and thereby support each other. The use of an intermediate support member 212 is then not necessary. The angle of rotation need not be a full 90 degrees, and may be as small as, say, 30 degrees depending upon relative pitches of pleats 232, 332 and strengths of pleated first and second filter elements 220, 350.

The embodiment of the invention shown in FIG. 5 is otherwise similar to that shown in FIG. 3.

FIG. 6 shows another embodiment of the invention, in which a single-layer pleated first filter element 320 containing a sorbent 228 such as activated charcoal for the removal of odoriferous material from the air is combined with a second filter element 450 having a first layer of filtering material 452 and a second layer of filtering material 454. Filter element 320 is preferably moderate in degree of fineness of mesh so that, with its large surface area due to its pleated construction, it may function both as a prefilter of relatively large particles and as a first main filter. First filter element 320 is preferably also provided a sorbent 228 such as activated charcoal. First filter element 320 may be provided support members 238 and/or 240 (shown in FIG. 4) if necessary to avert distortion or collapse when experiencing a pressure drop in the presence of flowing air.

Second filter element 450 includes a layer of a first filtering material 452 and a layer of a second filtering material 454, both of which layers may be substantially planar in configuration. The layers of filtering materials 452, 454 are preferably attached (e.g., by distributed spots of adhesive or by plastic or metal rivets with washers) to form a substantially planar laminated second filter element 450. Second filter element 450 is preferably glued to outlet screen 210 and to first filter element 320 or, if used, to an intermediate support screen 212 (shown in FIG. 5).

First filtering material 452 may be fabricated of the same substance as is second filtering material 454, but is preferably intermediate in fineness of mesh between that of first filter element 320 and that of second filtering material 454 so that it may perform as a second main filter and second filtering material 454 may perform as a postfilter. Either or both filtering materials 452, 454 may include a biostat 252 such as potassium permanganate.

Construction and configuration of the embodiment of the invention shown in FIG. 6 is otherwise similar to those discussed above and shown in FIGS. 5 and 3.

Figure 7:
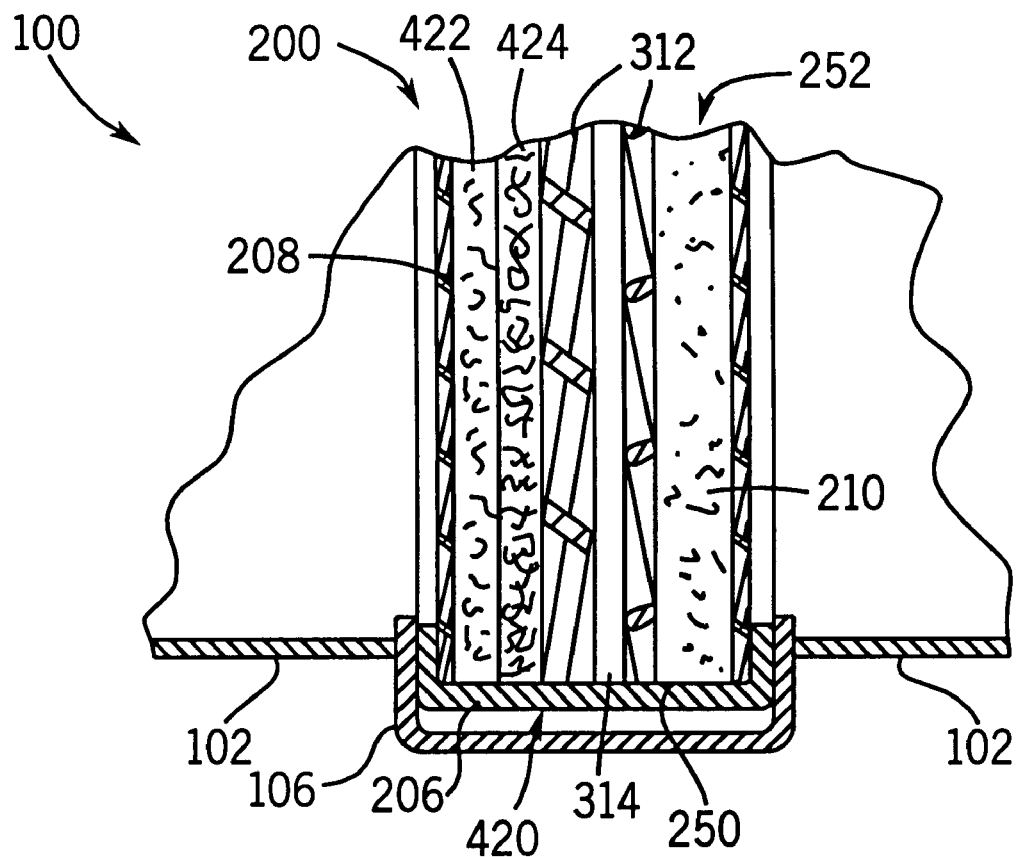
FIG. 7 is a partial sectional view of another embodiment of the air circulating system shown in FIG. 3.

FIG. 7 shows another embodiment of the invention, in which a planar first filter element 420 includes a layer of a first filtering material 422 and a layer of a second filtering material 424. First filtering material 422 is preferably of a relatively coarse mesh so that it may function as a prefilter of larger particles, and second filtering material 424 is preferably of a medium mesh so that it may function as a main filter. The layers of filtering materials 422, 424 are preferably attached (e.g., by distributed spots of adhesive or by plastic or metal rivets with washers) to form a substantially planar laminated first filter element 420. First filter element 420 is preferably glued to inlet screen 208 and to second filter element 250 or to, if used, an intermediate support member 312. Second filter element 250 may be similar or identical to that shown in FIG. 3 and discussed above.

Either or both layers of first filter element 420 preferably include sorbent 228, which may be activated charcoal, and second filter element 250 preferably includes a biostat 252 such as potassium permanganate. First filtering material 422, second filtering material 424, and second filter element 250 may be fabricated of any suitable filtering material including those referred to above, with at least one of them preferably including an electret material such as polypropylene strands or fibers for electrostatic retention of at least some particles within the air stream. Intermediate support member 312, if used, may be located as shown, interposed between first filter element 420 and second filter element 250. Intermediate support member 312 may be fabricated in a manner which allows filtrate accumulated upon the inlet face of second filter element 250 to fall by gravity to the bottom of a precipitation chamber 314 located within intermediate support member 312. Precipitation chamber 314 may be configured, for example, as a gap between two spaced-apart grids or screens forming intermediate support member 312.

While various embodiments and modifications of the present invention have been described above, other modifications of the invention could be made. For example, the precipitation chamber 314 shown in FIG. 7 for one embodiment could at well be incorporated in the all the embodiments and FIGURES. Any combination of pleated and planar filter elements may be employed. A filter element having more than two layers of filtering materials and/or more than one sorbent, biocide, or chemical additive could be used. These modifications and others are intended to fall within the scope of the present invention as defined by the claims below.

What is claimed is:

1. An air circulating system for circulating air including odor-causing materials including chemicals and organisms, the system comprising:
  a fan coupled to air stream ducting of the air circulation system for causing movement of air in a stream through the ducting;
  a filter holder configured to hold an air filtering device supported within the air stream; and
  an air filtering device for removing from the circulating air at least a portion of the odor-causing materials, the air filter device having first and second filter elements, the first filter element including at least one layer of a first filtering material, at least one layer of a second filtering material different from the first filtering material, and a first support member which is interposed between and secured to the at least one layer of the first filtering material and the at least one layer of the second filtering material, the support member including a plurality of openings therein.

2. The air circulating system of claim 1, wherein:
  at least one of the first filter element and the second filter element is pleated;
  the first element is configured to remove particles from the air of at least a first size; and
  the second filter element is configured to remove particles from the air which are of a second size, the second size being smaller than the first size.

3. The air circulating system of claim 2, wherein:
  the first layer of filtering material is fabricated from a foamed polymer, and includes a sorbent material suitable for removing odor-causing materials from the air stream; and
  the second filter element is constructed of at least one layer of fine-mesh filtering material to trap particles of filtering material which leave the first filter element and enter the air stream.

4. The air circulating system of claim 3, wherein the sorbent filtering material is activated charcoal.

5. The air circulating system of claim 2, wherein:
  the first layer of filtering material is fabricated from synthetic microfibers, and includes a sorbent material suitable for removing odor-causing materials from the air stream; and
  the second filter element is constructed of at least one layer of fine-mesh filtering material to trap particles of filtering material which leave the first filter element and enter the air stream.

6. The air circulating system of claim 5, wherein the sorbent filtering material is activated charcoal.

7. The air circulating system of claim 2, wherein the second filter element includes a biostat for neutralization of bacteria contained within the air stream.

8. The air circulating system of claim 7, wherein the biostat is potassium permanganate.

9. The air circulating system of claim 2, further comprising:
  a removable housing configured to hold the at least first and second filter elements within the filter holder, the housing comprising a peripherally disposed enclosing member, an inlet screen member, and an outlet screen member, the housing being configured to fit within the filter holder; and
  pleat support members configured to maintain the shapes of the pleats during conditions of high pressure drop across the one or more pleated filter elements when the one or more pleated filter elements becomes at least partially clogged with filtrate.

10. The air circulating system of claim 9, wherein the support member is attached to the first and second filtering materials by adhesive.

11. The air circulating system of claim 10, wherein the support member is glued to at least distributed portions of the outlet side of the first filter element and of the inlet side of the second filter element.

12. The air circulating system of claim 9, wherein:
  the pleats are of depths, measured in a direction substantially parallel to the direction of airflow, of between 4 and 8 inches; and
  the ratios of pleat depth to pleat pitch are between 3:1 and 30:1, pleat pitch being the dimensional distance between like points on adjacent pleats of a particular filter element and being measured in a direction which is substantially transverse to the nominal direction of air flow.

13. An air circulation system comprising:
  a fan coupled to air stream ducting of the air circulation system for causing movement of air in a stream through the ducting;
  a filter holder for an air filtering device supported within the air stream; and
  an air filtering device having at least a first filter element and a second filter element, at least one of the first and second filter elements being of pleated configuration, wherein:
    the first filter element includes at least one layer of a first filtering material, at least one layer of a second filtering material different from the first filtering material, a support member interposed between and secured to the first layer and the second layer, and activated charcoal disposed within at least one of the layers;

the second filter element is constructed of a filtering material which includes at least one of glass fibers and potassium permanganate; and the at least one pleated filter element includes pleat support members.

14. The system of claim 13 wherein the support member includes a plurality of openings and is glued to the first and second layers.

15. An air filter for use in an air circulation system, comprising:

a housing configured to hold filter elements, the housing including a peripherally disposed enclosing member, an inlet screen member, and an outlet screen member;

a first filter element configured to remove particles from the air which are at least as large as a first size, the first filter element including activated charcoal;

a second filter element configured to remove particles from the air which are of second sizes, the second sizes being smaller than the first size, the second filter element including at least one of glass fibers and potassium permanganate; and a reticular support member interposed between and substantially in contact with the first filter element and the second filter element.

16. The filter of claim 15, wherein the reticular support member is attached to the first filter element and to the second filter element.

17. The filter of claim 16, wherein the reticular support member is glued to at least distributed portions of the outlet side of the first filter element and of the inlet side of the second filter element.

18. The filter of claim 15, wherein at least one of the filter elements is of pleated configuration.

19. The filter of claim 18, further comprising pleat support members configured to maintain the shapes of the pleats during conditions of high pressure drop across the one or more pleated filter elements when the one or more pleated filter elements becomes at least partially clogged with filtrate.

20. The filter of claim 15, wherein:

the pleats are of depths, measured in a direction substantially parallel to the direction of airflow, of between 4 and 8 inches; and the ratios of pleat depth to pleat pitch are between 3:1 and 30:1, pleat pitch being the dimensional distance between like points on adjacent pleats of a particular filter element and being measured in a direction which is substantially transverse to the nominal direction of air flow.

21. An air filter for use in an air circulation system, comprising:

a housing configured to hold filter elements, the housing including a peripherally disposed enclosing member, an inlet screen member, and an outlet screen member;

a first filter element having at least one layer of a first filtering material, at least one layer of a second filtering material different from the first filtering material, and a reticular support member which is interposed therebetween and is secured to the at least one layer of the first filtering material and to the at least one layer of the second filtering material, the support member including a plurality of openings therein, the first filter element configured to include pleats and to remove particles from the air of at least a first size; and a second filter element configured to include pleats and to remove particles from the air which are of second sizes, the second sizes being smaller than the first size.

22. The air filter of claim 21, wherein the second filter element is fabricated from a HEPA-type filtering material comprising wet-laid paper filled with glass fibers and wherein the second filter element removes particles larger than 0.3 microns from the air.

23. The air filter of claim 21, wherein the first filter element includes activated charcoal and the second filter element includes potassium permanganate.

* * * * *